US011751288B2

(12) United States Patent
Park

(10) Patent No.: US 11,751,288 B2
(45) Date of Patent: Sep. 5, 2023

(54) HEAT-EMITTING TRANSPARENT PLATE, METHOD OF MANUFACTURING THE HEAT-EMITTING TRANSPARENT PLATE, HEAT-EMITTING DEVICE INCLUDING THE HEAT-EMITTING TRANSPARENT PLATE AND OBJECTS INCLUDING THE HEAT-EMITTING DEVICE

(71) Applicant: SAMSUNG ELECTRONICS CO., LTD., Suwon-si (KR)

(72) Inventor: Junghyun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 929 days.

(21) Appl. No.: 16/713,254

(22) Filed: Dec. 13, 2019

(65) Prior Publication Data

US 2020/0196391 A1 Jun. 18, 2020

(30) Foreign Application Priority Data

Dec. 14, 2018 (KR) .......................... 10-2018-0162154

(51) Int. Cl.
*H05B 1/02* (2006.01)
*F21V 7/00* (2006.01)
(Continued)

(52) U.S. Cl.
CPC ............. *H05B 1/0236* (2013.01); *F21V 5/00* (2013.01); *F21V 7/00* (2013.01); *H05B 6/46* (2013.01);
(Continued)

(58) Field of Classification Search
CPC .. H05B 1/0235; H05B 6/46; H05B 2203/017; H05B 2203/031; H05B 2214/02;
(Continued)

(56) References Cited

U.S. PATENT DOCUMENTS

2006/0076006 A1* 4/2006 Duguay ................... F24C 15/34
126/271.1
2012/0024505 A1 2/2012 Yoon et al.
(Continued)

FOREIGN PATENT DOCUMENTS

CN 109641793 A * 4/2019 ............. B32B 17/10
EA 029632 B1 * 4/2018
(Continued)

*Primary Examiner* — Shawntina T Fuqua
(74) *Attorney, Agent, or Firm* — Sughrue Mion, PLLC

(57) ABSTRACT

A heat-emitting transparent plate includes a heat-emitting region that is transparent to visible light and is a region that emits heat by absorbing infrared rays. The heat-emitting region includes a meta-surface, and the meta-surface includes a plurality of meta-patterns to absorb infrared rays. A method of manufacturing a heat-emitting transparent plate includes forming a material layer on a transparent substrate and forming a plurality of patterns on the transparent substrate by patterning the material layer. The plurality of patterns include a material that is transparent to visible light and that emits heat by absorbing infrared rays, and a pitch of the plurality of patterns is less than a wavelength of the infrared rays. A heat-emitting device includes the heat-emitting transparent plate and a light source.

42 Claims, 15 Drawing Sheets

(51) Int. Cl.
  *F21V 5/00*  (2018.01)
  *H05B 6/46*  (2006.01)
  *F21W 107/10*  (2018.01)

(52) U.S. Cl.
  CPC ... *F21W 2107/10* (2018.01); *H05B 2203/017* (2013.01)

(58) Field of Classification Search
  CPC .... H05B 3/0042; H05B 3/0084; H05B 3/845; F21V 5/00; F21V 7/00; F21W 2107/10; C03C 2218/33; C03C 17/3628; C03C 17/3644; C03C 17/3657; C03C 17/36; B60J 1/00; B60J 1/002; B60J 1/003; G02B 1/002
  See application file for complete search history.

(56) References Cited

U.S. PATENT DOCUMENTS

| | | | |
|---|---|---|---|
| 2015/0210144 A1 | 7/2015 | Ishioka | |
| 2017/0178910 A1 | 6/2017 | Vandervorst et al. | |
| 2020/0225389 A1* | 7/2020 | Ding | ............. G02B 1/002 |

FOREIGN PATENT DOCUMENTS

| | | | | |
|---|---|---|---|---|
| JP | 2014115358 A | * | 6/2014 | |
| JP | 2014160234 A | * | 9/2014 | |
| KR | 10-2011-0121459 A | | 11/2011 | |
| KR | 20200125245 A | * | 11/2020 | |
| WO | WO-2005012454 A1 | * | 2/2005 | ............. B32B 17/10 |

* cited by examiner

HEAT-EMITTING TRANSPARENT PLATE, METHOD OF MANUFACTURING THE HEAT-EMITTING TRANSPARENT PLATE, HEAT-EMITTING DEVICE INCLUDING THE HEAT-EMITTING TRANSPARENT PLATE AND OBJECTS INCLUDING THE HEAT-EMITTING DEVICE

CROSS-REFERENCE TO RELATED APPLICATION

This application is based on and claims priority under 35 U.S.C. § 119 to Korean Patent Application No. 10-2018-0162154, filed on Dec. 14, 2018, in the Korean Intellectual Property Office, the disclosure of which is incorporated by reference herein in its entirety.

BACKGROUND

1. Field

The disclosure relates to transparent plates, methods of using or applying the transparent plates, and more particularly, to transparent plates (hereinafter, heat-emitting transparent plates) that are transparent to visible light and emit heat by absorbing infrared rays, methods of manufacturing the heat-emitting transparent plates, heat-emitting devices including the heat-emitting transparent plates, and objects including the heat-emitting devices.

2. Description of Related Art

When there is a temperature difference between the inside and outside of a glass window, mist appears on the glass window. This phenomenon may be easily experienced on a vehicle or on glasses in winter. In the case of a vehicle, the mist interrupts a view of a driver. The mist on the vehicle may be removed by using an air-conditioner, a heater, or a heating wire according to seasons or locations of the glass window. For this, a new material, such as graphene, may be used.

SUMMARY

In accordance with an aspect of the disclosure, a heat-emitting transparent plate includes a heat-emitting region that is transparent to visible light and configured to emit heat by absorbing infrared rays, wherein the heat-emitting region includes a meta-surface, and wherein the meta-surface includes a plurality of meta-patterns configured to absorb the infrared rays.

The plurality of meta-patterns may include a plurality of first meta-patterns; and a plurality of second meta-patterns different from the plurality of first meta-patterns.

Each meta-pattern from among the plurality of meta-patterns may include a dielectric layer and a metal layer that are stacked.

The heat-emitting region may include a base substrate; and the plurality of meta-patterns formed on the base substrate.

The heat-emitting region may include a base substrate having a recess; and the plurality of meta-patterns formed in the recess.

The heat-emitting transparent plate may further include a passivation film covering the plurality of meta-patterns.

The infrared rays may have a wavelength range from 900 nm to 1,500 nm.

A pitch of the plurality of first meta-patterns may be different from a pitch of the plurality of second meta-patterns.

A pitch of the plurality of first meta-patterns may be equal to a pitch of the plurality of second meta-patterns, and a plane shape of the plurality of first meta-patterns may be different from a plane shape of the plurality of second meta-patterns.

Each meta-pattern from among the plurality of meta-patterns may include a first dielectric layer, a metal layer, and a second dielectric layer that are sequentially stacked.

Each meta-pattern from among the plurality of meta-patterns may have a layer structure in which a plurality of dielectric layers and a plurality of metal layers are sequentially and alternately stacked, and a dielectric layer from among the plurality of dielectric layers may be stacked before any of the plurality of metal layers.

Each meta-pattern from among the plurality of meta-patterns may have a layer structure in which a plurality of metal layers and a plurality of dielectric layers are sequentially and alternately stacked, and a metal layer from among the plurality of metal layers may be stacked before any of the plurality of dielectric layers.

The metal layer may include a first metal layer and a second metal layer that are sequentially stacked.

A plane shape of the plurality of first meta-patterns may be identical to a plane shape of the plurality of second meta-patterns.

The plurality of first meta-patterns and the plurality of second meta-patterns may be alternately arranged in a direction.

The pitch of the plurality of first meta-patterns may be less than a wavelength of incident light.

Optical characteristics of the first dielectric layer may be equal to optical characteristics of the second dielectric layer.

A thickness of the first dielectric layer may be equal to a thickness of the second dielectric layer.

Optical characteristics of the first dielectric layer may be equal to optical characteristics of the second dielectric layer.

Optical characteristics of the first metal layer may be equal to optical characteristics of the second metal layer.

The heat-emitting transparent plate may further include a passivation film covering the plurality of meta-patterns.

The heat-emitting transparent plate may further include a passivation film covering the plurality of meta-patterns.

The pitch of the plurality of first meta-patterns may be less than a wavelength of incident light.

A heat-emitting device may include the above-noted heat-emitting transparent plate; and a light source configured to emit the infrared rays to the heat-emitting transparent plate.

An incidence angle of the infrared rays incident to the heat-emitting transparent plate may be greater than 45°.

The light source may be arranged along a side of the heat-emitting transparent plate.

The light source may be arranged at at least two locations around the heat-emitting transparent plate.

In accordance with an aspect of the disclosure, a method of manufacturing a heat-emitting transparent plate includes forming a material layer on a transparent substrate; and forming a plurality of patterns on the transparent substrate by patterning the material layer, wherein the plurality of patterns include a material that is transparent to visible light, the material being configured to emit heat by absorbing infrared rays, and wherein a pitch of the plurality of patterns is less than a wavelength of the infrared rays.

The forming of the material layer may include forming a dielectric layer and forming a metal layer.

Some patterns from among the plurality of patterns may have a plane shape different from a plane shape of the remaining patterns from among the plurality of patterns.

A pitch of a first pattern from among the plurality of patterns may be different from a pitch of a second pattern from among the plurality of patterns.

A pitch of the plurality of patterns may gradually increase from one end of the heat-emitting transparent plate to another end of the heat-emitting transparent plate.

The method may further include forming a passivation layer covering the plurality of patterns.

The forming of the material layer may include forming a first dielectric layer on the transparent substrate; forming a metal layer on the first dielectric layer; and forming a second dielectric layer on the metal layer.

The forming of the material layer may include forming a plurality of dielectric layers sequentially and alternately stacked more than twice with a plurality of metal layers.

The metal layer may be formed before the dielectric layer.

The dielectric layer may include a plurality of dielectric layers and the metal layer may include a plurality of metal layers, and the forming of the material layer may include forming the plurality of metal layers sequentially and alternately stacked for more than twice with the plurality of dielectric layers.

In accordance with an aspect of the disclosure, a method of manufacturing a heat-emitting transparent plate includes forming a recess in a transparent substrate; forming a material layer in the recess; and forming a plurality of patterns in the recess by patterning the material layer, wherein the plurality of patterns include a material that is transparent to visible light, the material being configured to emit heat by absorbing infrared rays, and wherein a pitch of the plurality of patterns is less than a wavelength of the infrared rays.

The plurality of patterns may include a dielectric layer and a metal layer that are sequentially stacked.

Each pattern from among the plurality of patterns may include a first dielectric layer; a metal layer formed on the first dielectric layer; and a second dielectric layer formed on the metal layer.

The method may further include forming a passivation film covering the plurality of patterns.

An object may include the above-noted heat-emitting device, and the heat-emitting transparent plate may be used as a window through which a portion of the object is viewed.

The window may be provided on one from among a transportation device, a helmet, goggles, glasses, a building, and a fixed apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
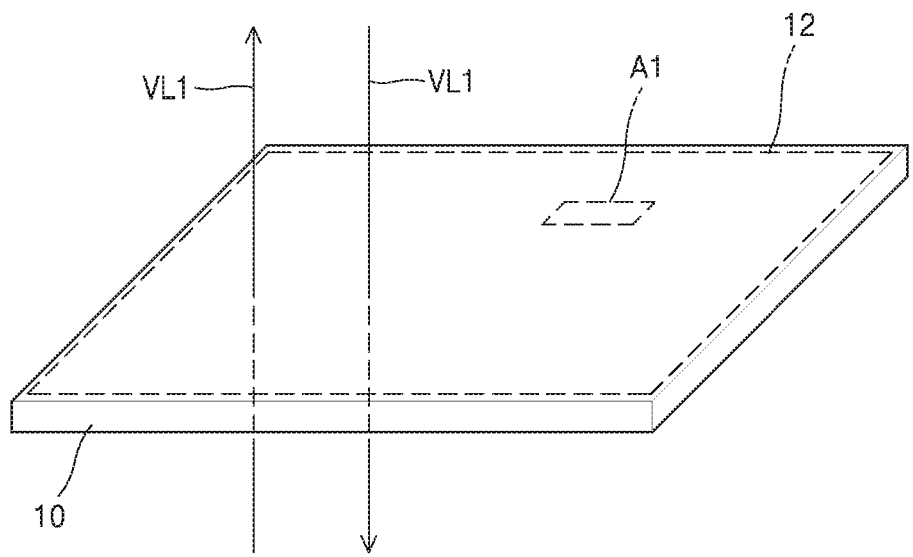
FIG. 1 is a perspective view of a heat-emitting transparent plate configured to emit heat by absorbing infrared rays, according to an embodiment.

When there is a temperature difference between the inside and outside of a glass window, mist may occur on the glass window, and when the temperature difference is severe, even frost may form on the glass window. The mist or frost may interrupt a view, and thus, may greatly reduce visibility. A transparent plate like glass is used as an essential material in various fields, such as transportation means (for example, vehicles, air planes, trains, etc.), devices, glasses, goggles, helmets, etc. Accordingly, a rapid removal of the visual interruption phenomenon that occurs on a glass window due to a temperature difference between the inside and outside of a glass window is a way of rapidly restoring the visual field and visibility of a driver or a user, and thus, is a great help in ensuring the safety of the driver and the user.

Accordingly, the present disclosure provides a glass plate that may prevent a visual interruption phenomenon, such as mist or frost due to a temperature difference between the inside and outside of glass and rapidly remove the visual interruption phenomenon when the visual interruption phenomenon occurs. The glass plate emits heat in an optical method and has a configuration for emitting heat.

Hereinafter, heat-emitting transparent plates, methods of manufacturing the same, heat-emitting devices including the heat-emitting transparent plates, and objects to which the heat-emitting devices are applied are described in detail. In the drawings, thicknesses of layers or regions are exaggerated for clarity of the specification.

FIG. 1 shows a heat-emitting transparent plate 10 according to an embodiment.

Referring to FIG. 1, the heat-emitting transparent plate 10 according to an embodiment includes a heat-emitting region 12. The heat-emitting transparent plate 10 may include a material plate that is transparent to visible light VL1. As an example, the heat-emitting transparent plate 10 may include a glass plate. The heat-emitting region 12 emits heat by absorbing energy of a given wavelength band of incident light and may transmit or reflect the remaining wavelength band of the incident light. The heat-emitting region 12 may include a meta-surface that absorbs energy of the given wavelength band of the incident light. The heat-emitting region 12 may be the entire region of the heat-emitting transparent plate 10. The given wavelength band may be, for example, an infrared band and may include infrared rays having a wavelength greater than 900 nm. For example, the given wavelength band may include infrared rays having a wavelength of 980 nm, 1,300 nm, or 1,500 nm. The heat-emitting region 12 absorbs most incident light of the given wavelength in an infrared ray range. However, the heat-emitting region 12 also reflects a small portion of the incident light of the given wavelength in the infrared ray range, as described below.

The heat-emitting region 12 may include a meta-surface for emitting heat energy by absorbing infrared rays, and the meta-surface may be the entire surface of the heat-emitting region 12. The meta-surface included in the heat-emitting region 12 will be described by describing, as an example, a meta-surface included in a first region A1 of the heat-emitting region 12 as shown in FIG. 1.

Figure 2:
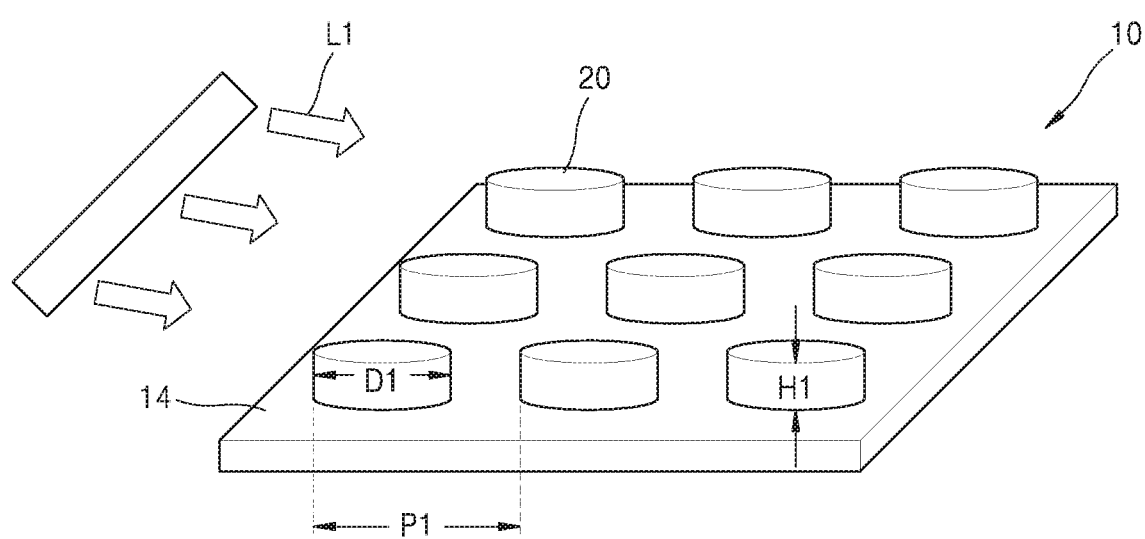
FIG. 2 is a magnified perspective view of a first region of a meta-surface of the heat-emitting transparent plate of FIG. 1.

FIG. 2 shows an example of the first region A1 of the heat-emitting region 12 of FIG. 1.

Referring to FIG. 2, the heat-emitting transparent plate 10 includes a base substrate 14 and a plurality of meta-patterns 20 on a surface of the base substrate 14. The surface of the base substrate 14, on which the plurality of meta-patterns 20 are formed, is referred to as a meta-surface. The surface of the base substrate 14 may be a surface through which light L1 enters or a surface facing the surface through which the light L1 enters. As an example, the meta-patterns 20 may be on the surface (for example, an upper surface of the base substrate 14) of the base substrate 14, through which the light L1 enters. As another example, the meta-patterns 20 may be on a surface (for example, a bottom surface of the base substrate 14) facing the surface of the base substrate 14 through which the light L1 enters.

Figure 9:
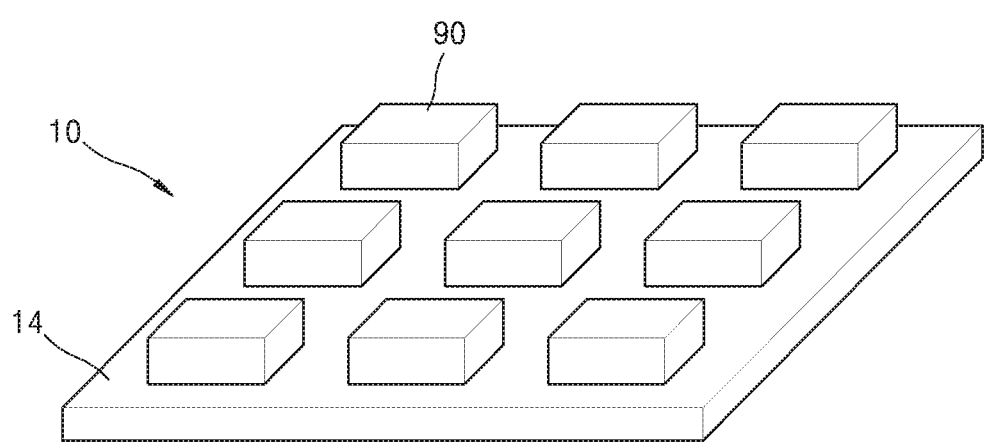
FIG. 9 is a magnified perspective view of the first region of the meta-surface of the heat-emitting transparent plate of FIG. 1.

The meta-patterns 20 may be distributed on all of the meta-surface of the heat-emitting region 12. Each of the meta-patterns 20 may be referred to as a unit meta-pattern. The meta-patterns 20 may have a shape identical to each other. For example, each of the meta-patterns 20 may have a cylindrical shape as depicted in FIG. 2 or, as depicted in FIG. 9, may have a square column shape. For convenience of explanation, nine meta-patterns 20 are illustrated to be included in the heat-emitting transparent plate 10 of the first region A1. However, the number of meta-patterns 20 is not limited to nine.

The meta-patterns 20 are arranged in a horizontal direction and a vertical direction with a given pitch P1. Here, the pitch P1 is the distance from an edge of one meta-pattern 20 to the same edge of an adjacent meta-pattern 20 as shown in FIG. 2. The pitch P1 may have a given value in a range less than a wavelength of the incident light L1. As an example, the pitch P1 may be approximately 150 nm. The meta-patterns 20 may have a given height H1 and a diameter D1. The diameter D1 is less than the pitch P1. As an example, the diameter D1 may be approximately 120 nm. Gaps between the meta-patterns 20 may be less than the diameter D1 of the meta-patterns 20.

The incident light L1 may be light of an infrared band, and, as an example, may be an infrared ray having a wavelength of approximately 980 nm.

Figure 3:
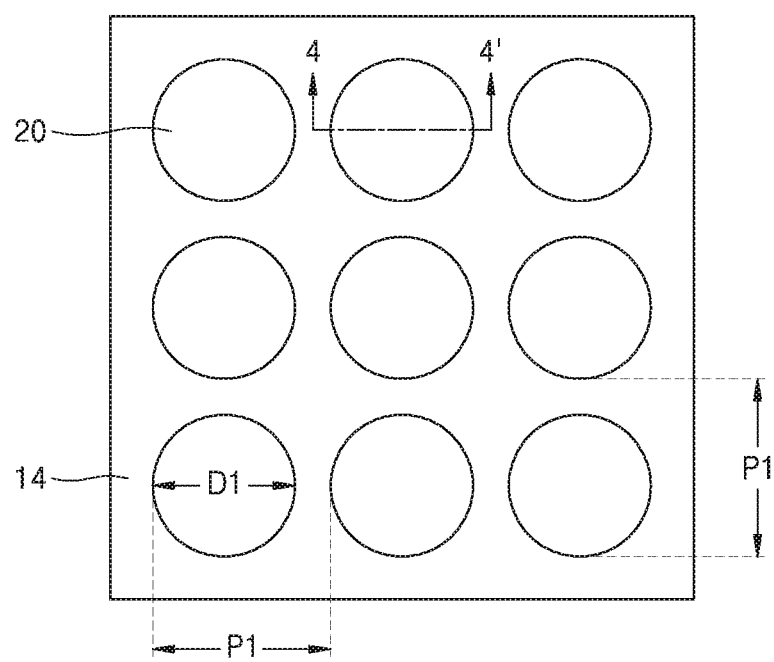
FIG. 3 is a plan view of FIG. 2.

FIG. 3 is a plan view of a surface on which the meta-patterns 20 of FIG. 2 are formed.

Referring to FIG. 3, a plane shape of each of the meta-patterns 20 is a circular shape. The meta-patterns 20 are arranged in a horizontal direction and a vertical direction with the same pitch P1 in both directions. The pitch P1 of the meta-patterns 20 may vary according to regions, as described below.

Figure 4:
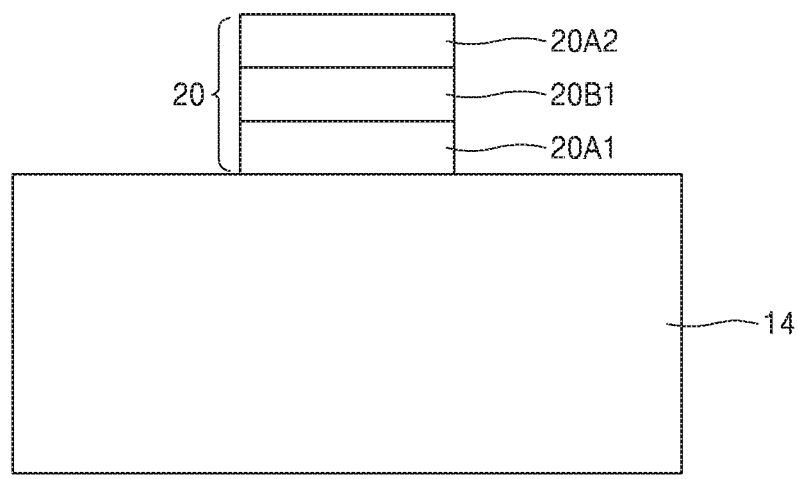
FIGS. 4 through 8 are cross-sectional views of layer structures of a meta-pattern formed on a meta-surface of a heat-emitting transparent plate according to an embodiment.

FIG. 4 is a cross-sectional view taken along line 4-4' of FIG. 3, and shows an example of a layer structure of the unit meta-pattern 20.

Referring to FIG. 4, the unit meta-pattern 20 formed on the base substrate 14 may include a first dielectric layer 20A1, a metal layer 20B1, and a second dielectric layer 20A2 sequentially stacked from the base substrate 14. The first dielectric layer 20A1 and the second dielectric layer 20A2 may include the same material. The heat-emitting transparent plate 10 may include, for example, a base substrate 14 including a SiO$_2$ plate having a refractive index of approximately 1.46. The refractive index of the first dielectric layer 20A1 and the second dielectric layer 20A2 may be approximately 2.5. The first dielectric layer 20A1 and the second dielectric layer 20A2 may include, for example, a ZnS layer. A thickness of the first dielectric layer 20A1 and the second dielectric layer 20A2 may be identical to or different from each other. The first dielectric layer 20A1 and the second dielectric layer 20A2 may each have a thickness of approximately 20 nm, but the present embodiment is not limited thereto. The metal layer 20B1 may be an Ag layer, but is not limited thereto. A thickness of the metal layer 20B1 may be approximately 10 nm, but is not limited thereto.

Figure 5:
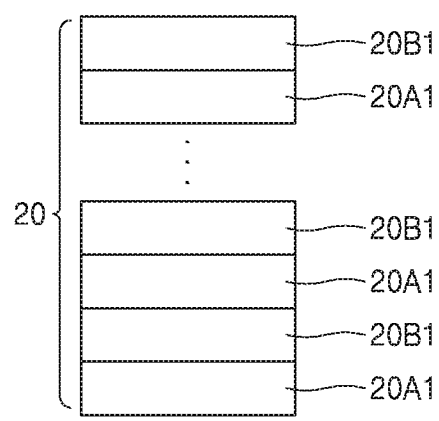

FIG. 5 is a cross-sectional view taken along line 4-4' of FIG. 3, and shows another example of a layer structure of the unit meta-pattern 20. For convenience, the base substrate 14 is omitted in FIG. 5.

Referring to FIG. 5, the unit meta-pattern 20 has a structure in which the first dielectric layer 20A1 and the metal layer 20B1 are alternately and repeatedly stacked. That is, the first dielectric layer 20A1 and the metal layer 20B1 are sequentially stacked on the heat-emitting transparent plate 10 and the first dielectric layer 20A1 and the metal layer 20B1 are re-sequentially stacked on the metal layer 20B1.

Figure 6:

FIG. 6 is a cross-sectional view taken along 4-4' of FIG. 3, and shows another example of a layer structure of the unit meta-pattern 20. For convenience, the base substrate 14 is omitted in FIG. 6.

Referring to FIG. 6, the unit meta-pattern 20 may include a metal layer 60 and a dielectric layer 62 sequentially stacked in the stated order. In other words, the metal layer 60 may be formed directly on the base substrate 14 and the dielectric layer 62 may be formed on the metal layer 60. The metal layer 60 may include the metal layer 20B1 described with reference to FIG. 4. The dielectric layer 62 may include the first dielectric layer 20A1 described with reference to FIG. 4.

Figure 7:
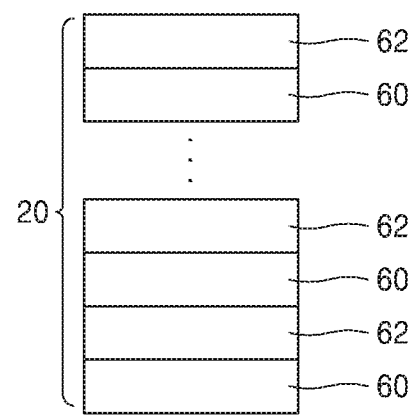

FIG. 7 is a cross-sectional view taken along line 4-4' of FIG. 3, and shows another example of a layer structure of the unit meta-pattern 20. For convenience, the base substrate 14 is omitted in FIG. 7.

FIG. 7 shows an example of a magnified view of the unit meta-pattern 20 of FIG. 6.

Referring to FIG. 7, the unit meta-pattern 20 may have a layer structure in which a unit layer including the metal layer 60 and the dielectric layer 62 is repeatedly stacked. That is, the unit meta-pattern 20 may have a layer structure in which the metal layer 60 and the dielectric layer 62 are sequentially, alternately, and repeatedly stacked.

Figure 8:
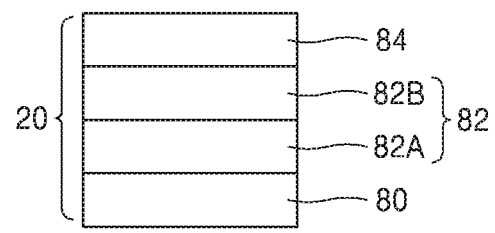

FIG. 8 is a cross-sectional view taken along line 4-4' of FIG. 3, and shows another example of a layer structure of the unit meta-pattern 20. For convenience, the base substrate 14 is omitted in FIG. 8.

Referring to FIG. 8, the unit meta-pattern 20 may include a first dielectric layer 80, a metal layer 82, and a second dielectric layer 84. The first dielectric layer 80 may include the first dielectric layer 20A1 of FIG. 4. The second dielectric layer 84 may include the second dielectric layer 20A2 of FIG. 4. The first dielectric layer 80 and the second dielectric layer 84 may have thicknesses equal to or different from each other. The metal layer 82 may include a first metal layer 82A and a second metal layer 82B that are sequentially stacked in the stated order. In other words, the first dielectric layer 80 may be formed directly on the base substrate 14, the first metal layer 82A may be formed on the first dielectric layer 80, the second metal layer 82B may be formed on the first metal layer 82A, and the second dielectric layer 84 may be formed on the second metal layer 82B as shown in FIG. 8. The first metal layer 82A and the second metal layer 82B may have refractive indexes equal to or different from each other. The first metal layer 82A and the second metal layer 82B may include metal layers materially different from each other. One of the first metal layer 82A and the second metal layer 82B may include an Ag layer. The first metal layer 82A and the second metal layer 82B may have thicknesses equal to or different from each other. The metal layer 82 may include more than two metal layers. When the metal layer 82 includes more than two metal layers, the metal layer 82 may be applied to the layer structure of the unit meta-pattern 20 shown in FIGS. 6 and 7.

The layer structures of the unit meta-pattern 20 described with reference to FIGS. 4 through 8 are examples, and, besides the above structures, there may be various layer structures.

The layer structures of the unit meta-pattern 20 described with reference to FIGS. 4 through 8 may be applied to the example meta-pattern described herewith.

FIG. 9 shows another example of the first region A1 of FIG. 1, and a between the heat-emitting transparent plate 10 of FIG. 2 and the heat-emitting transparent plate 10 of FIG. 9 is that the shape of each of meta-patterns 90 is a square column shape. Dimensions (for example, pitch, diameter, gaps, height, etc.) of the meta-patterns 90 may follow the dimensions of the meta-patterns 20 described with reference to FIG. 2. A plane shape of each of the meta-patterns 90 may be a square shape or a rectangular shape. When the plane shape of each of the meta-patterns 90 is a square shape, a pitch of the meta-patterns 90 in a horizontal direction and a vertical direction may be equal to each other. When the plane shape of each of the meta-patterns 90 is a rectangular shape, the pitches of the meta-patterns 90 in the horizontal direction and the vertical direction may be different from each other.

The plane shape of the meta-patterns 20 included in the heat-emitting region 12 including the meta-surface of FIG. 1 may be the circular shape depicted in FIG. 2 or the square shape of FIG. 9, but is not limited thereto. Besides the above, the plane shape of the meta-patterns 90 may be various shapes (for example, an oval shape, a polygonal shape, a symbol or a letter shape, etc.).

Figure 10:
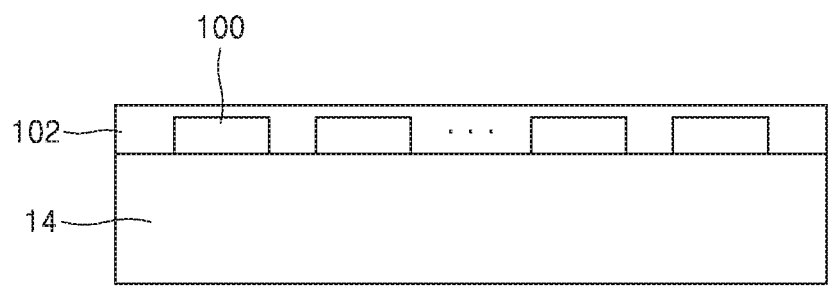
FIG. 10 is a cross-sectional view of a heat-emitting transparent plate according to an embodiment, wherein a meta-surface is covered by a passivation film.

FIG. 10 shows an embodiment wherein the meta-surface is protected, that is, all the meta-patterns 100 are covered by a passivation film 102. The passivation film 102 may include, for example, a $SiO_2$ film. The meta-patterns 100 may be the meta-patterns 20 depicted in any of FIGS. 2 through 8 or the meta-patterns 90 depicted in FIG. 9. That is, FIG. 10 shows that the heat-emitting region 12 of FIG. 1 is covered by the passivation film 102, and thus, all of the meta-surface is protected.

Figure 11:
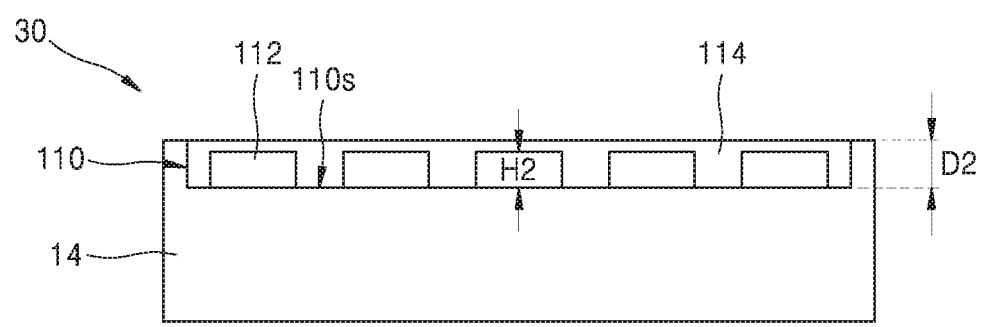
FIG. 11 is a cross-sectional view of a heat-emitting transparent plate according to an embodiment.

FIG. 11 shows a heat-emitting transparent plate 30 according to an embodiment.

Referring to FIG. 11, the heat-emitting transparent plate 30 includes the base substrate 14 and a recess 110 formed in an upper part of the base substrate 14. The recess 110 is inwardly formed with a given depth D2 from the upper surface of the heat-emitting transparent plate 30. The recess 110 may have a depth D2 equal to or greater than a height H2 of meta-patterns 112 to be formed on a bottom surface 110S of the recess 110. The plurality of meta-patterns 112 are formed on the bottom surface 110S of the recess 110. The meta-patterns 112 are distributed on the entire bottom surface 110S of the recess 110, and thus, all of the bottom surface 110S of the recess 110 may be a heat-emitting region, and also, a meta-surface. All of the meta-patterns 112 are covered by a passivation film 114. A surface of the passivation film 114 may be flat. The passivation film 114 may be materially equal to or different from the passivation film 102 of FIG. 10. In this way, since the meta-surface is covered by the passivation film 114, damage to the meta-surface may be prevented in a process (for example, cleaning or washing) of handling the heat-emitting transparent plate 30. As an example, when the heat-emitting transparent plate 30 is a windshield of a vehicle and a meta-surface is located outside the windshield, in a process of cleaning the windshield by using a wiper, damage to the meta-surface may be prevented by the passivation film 114.

Figure 12:
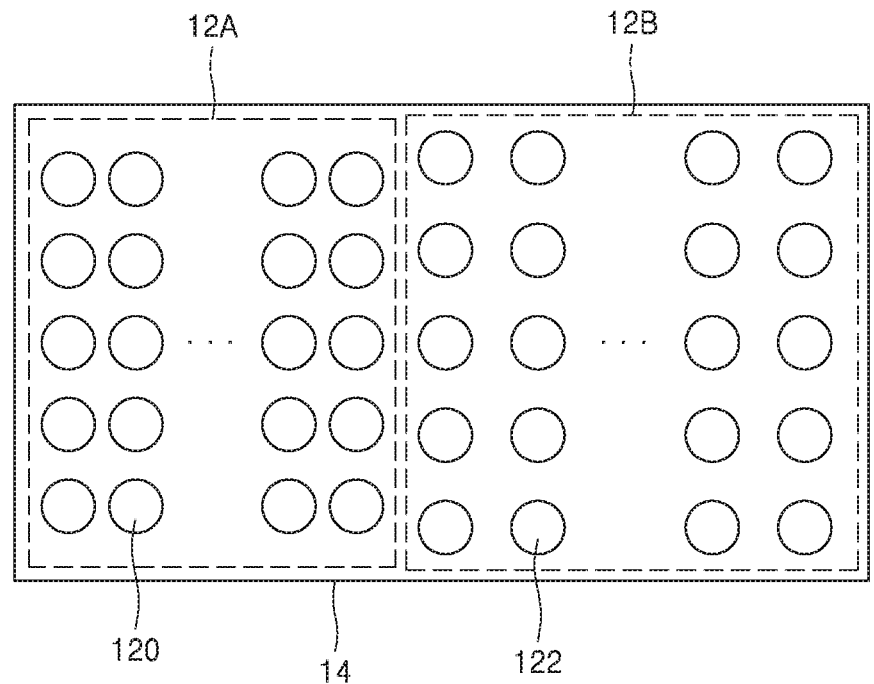
FIGS. 12 through 15 are plan views of various examples of pattern configurations of a meta-surface of a heat-emitting transparent plate according to an embodiment.

FIG. 12 is a plan view showing a distribution type of meta-patterns 120 and 122 on a meta-surface of the heat-emitting transparent plate 10 according to an embodiment.

Referring to FIG. 12, the base substrate 14 includes a first heat-emitting region 12A and a second heat-emitting region 12B. A sum of the first heat-emitting region 12A and the second heat-emitting region 12B may be the heat-emitting region 12 of FIG. 1. The first heat-emitting region 12A is a region where a plurality of meta-patterns 120 are arranged in a first distribution, and thus, may be referred to as a first meta-surface. The second heat-emitting region 12B is a region where a plurality of meta-patterns 122 are arranged in a second distribution, and thus, may be referred to as a second meta-surface. That is, a sum of the first meta-surface and the second meta-surface forms a total meta-surface of the base substrate 14.

The meta-patterns 120 on the first heat-emitting region 12A may be present as the first distribution and the meta-patterns 122 on the second heat-emitting region 12B may be present as the second distribution. However, a shape of each of the meta-patterns 120 and 122 on the first and second heat-emitting regions 12A and 12B may be equal to each other, or may be different from each other, as described below. The meta-patterns 120 on the first heat-emitting region 12A and the meta-patterns 122 on the second heat-emitting region 12B may be the meta-patterns 20 of any of FIGS. 2 through 8 or the meta-patterns 90 of FIG. 9, or may be meta-patterns of different types.

The first distribution of the meta-patterns 120 on the first heat-emitting region 12A and the second distribution of the meta-patterns 122 on the second heat-emitting region 12B will be described.

When the first distribution of the meta-patterns 120 on the first heat-emitting region 12A and the second distribution of the meta-patterns 122 on the second heat-emitting region 12B are compared, a pitch of the meta-patterns 120 on the first heat-emitting region 12A in a horizontal direction and a vertical direction is less than a pitch of the meta-patterns 122 on the second heat-emitting region 12B in the horizontal direction and the vertical direction. Accordingly, the density of the meta-patterns 120 on the first heat-emitting region 12A may be greater than that of the meta-patterns 122 on the second heat-emitting region 12B.

When the heat-emitting transparent plate 10 of FIG. 12 is used as a windshield (for example, a front glass) of a vehicle, of the first and second heat-emitting regions 12A and 12B, a region (for example, the first heat-emitting region 12A) having a relatively higher heat-emitting efficiency may be located directly in front of a driver's seat and a remaining region may be located in front of an assistant's seat.

Figure 13:
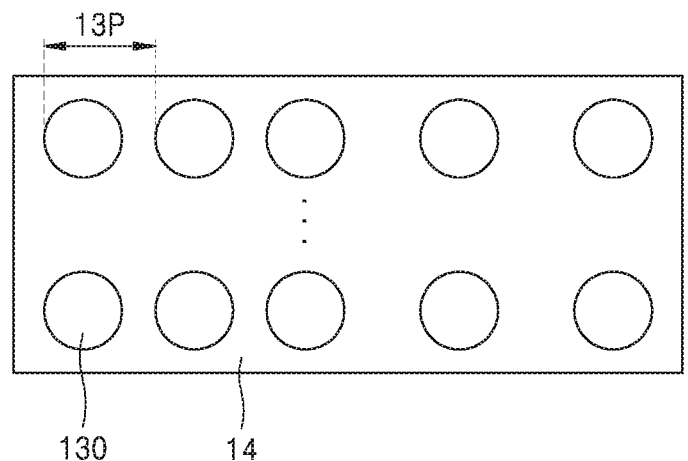

FIG. 13 shows another distribution type of meta-patterns 130 on a meta-surface of the heat-emitting transparent plate 10 according to an embodiment. The plurality of meta-patterns 130 on the base substrate 14 may be the meta-patterns 20 of any of FIGS. 2 through 8 or the meta-patterns 90 of FIG. 9, or may be meta-patterns of different types.

Referring to FIG. 13, the plurality of meta-patterns 130 are distributed from an edge to the other edge of the base substrate 14. The meta-patterns 130 may be distributed between an end and the other end of the base substrate 14. Pitches of the meta-patterns 130 may be gradually increased or decreased from an edge to the other edge of the base substrate 14. In FIG. 13, although a case is illustrated where the meta-patterns 130 are distributed in a horizontal direction, the meta-patterns 130 may be distributed in a vertical direction with the same distribution characteristic.

Figure 14:
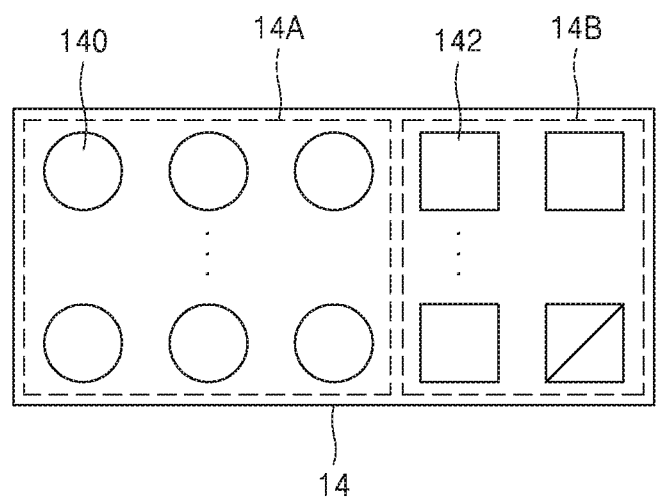
Figure 15:
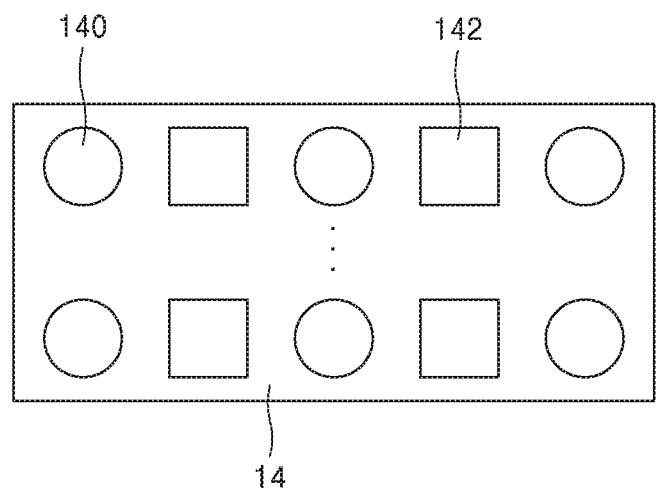

FIGS. 14 and 15 show a case that first and second meta-patterns 140 and 142 different from each other are mixed on a meta-surface of the base substrate 14.

Referring to FIG. 14, the base substrate 14 includes a first heat-emitting region 14A and a second heat-emitting region 14B. A sum of the first heat-emitting region 14A and the second heat-emitting region 14B may be the heat-emitting region 12 of FIG. 1. The first heat-emitting region 14A may be a first meta-surface. The second heat-emitting region 14B may be a second meta-surface. The plurality of first meta-patterns 140 are present on the first heat-emitting region 14A. The plurality of second meta-patterns 142 are present on the second heat-emitting region 14B. The first meta-patterns 140 have a circular plane shape, and may be the meta-patterns 20 of any of FIGS. 2 through 8. The first meta-patterns 140 may be distributed in a horizontal direction and a vertical direction with the same pitch. However, at least some of the first meta-patterns 140 may be arranged with pitches different from each other.

The plurality of second meta-patterns 142 may have a geometrical shape different from that of the first meta-patterns 140. The layer structure of the first meta-patterns 140 may be equal to or different from that of the second meta-patterns 142. As an example, the layer structures of the first and second meta-patterns 140 and 142 may be one of the layer structures depicted in any of FIGS. 4 through 8, or may be different from the layer structures depicted in FIGS. 4 through 8. A plane shape of the second meta-patterns 142 may be a square shape, and the second meta-patterns 142 may be the meta-patterns 90 of FIG. 9. The second meta-patterns 142 may be arranged in a horizontal direction and a vertical direction with the same pitch, but may be arranged with pitches different from each other.

Next, as depicted in FIG. 15, the first meta-patterns 140 and the second meta-patterns 142 may be evenly distributed all over the meta-surface of the base substrate 14. As an example, the first and second meta-patterns 140 and 142 may be alternately arranged in a first direction (for example, a horizontal direction). The first and second meta-patterns 140 and 142 may be arranged with a given pitch in a second direction (for example, a vertical direction) which is perpendicular to the first direction. The first and second meta-patterns 140 and 142 may also be alternately arranged in the second direction with the same alternate characteristic of the first and second meta-patterns 140 and 142.

In FIG. 15, the pitches of the first meta-patterns 140 and the second meta-patterns 142 may be constant, but may vary according to directions. As an example, the pitches of the first and second meta-patterns 140 and 142 may be constant, but the pitches of the first and second meta-patterns 140 and 142 in the second direction in which there is no alternate characteristic may be increased or decreased.

As depicted in FIG. 15, when the first and second meta-patterns 140 and 142 are mixed, the layer structure of the first meta-patterns 140 may be equal to or different from that of the second meta-patterns 142.

Figure 16:
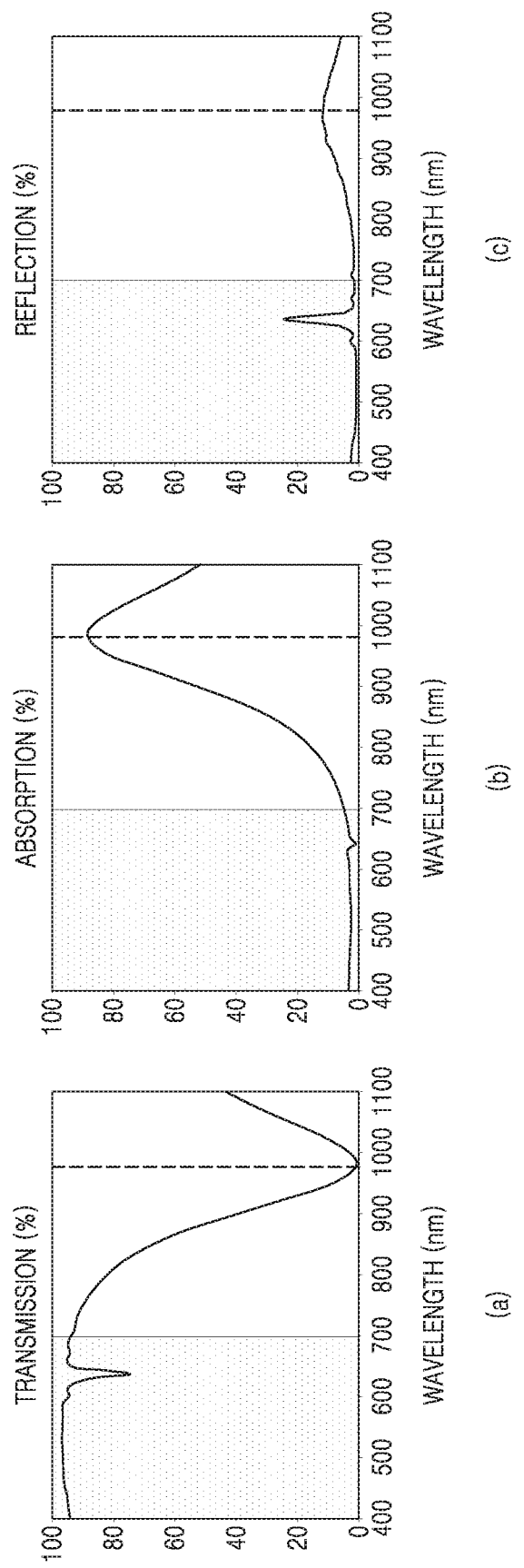
FIG. 16 shows graphs indicating optical characteristics of a heat-emitting transparent plate according to an embodiment.

FIG. 16 shows graphs indicating results of simulations performed for confirming optical characteristics of the heat-emitting transparent plate 10 having a meta-surface, according to an embodiment. FIG. 16(a) shows a transmission characteristic of a heat-emitting transparent plate 10. FIG. 16(b) shows the absorption characteristics of the heat-emitting transparent plate 10. FIG. 16(c) shows the reflection characteristics of the heat-emitting transparent plate 10. In FIG. 16, the horizontal axis indicates a wavelength of incident light, the vertical axis of FIG. 16(a) indicates transmission rate, the vertical axis of FIG. 16(b) indicates absorption rate, and the vertical axis of FIG. 16(c) indicates reflectivity of the heat-emitting transparent plate 10. In FIG. 16, the shaded region represents a visible light range (400 nm to 700 nm).

In the simulations, a $SiO_2$ plate having a refractive index of 1.46 is used as the base substrate 14. Meta-patterns having the layer structure of FIG. 4 are used as the meta-patterns 20. Also, ZnS layers respectively having refractive indexes of 2.5 and thicknesses of 20 nm are used as the first dielectric layer 20A1 and the second dielectric layer 20A2. An Ag layer having a thickness of 10 nm is used as the metal layer 2061. Light including visible light and an infrared ray is used as incident light.

First, referring to FIG. 16(a), it is seen that the transmission rate of the heat-emitting transparent plate 10 in a visible light range (400 nm to 700 nm) is greater than 95%. The reduction of the transmission rate at approximately 630 nm of the visible light range may be caused, as seen in FIG. 16(c), by the relatively high reflectivity of the heat-emitting transparent plate 10 at approximately 630 nm.

The transmission rate of the heat-emitting transparent plate 10 is reduced towards the infrared ray range. It is seen that the transmission rate of the heat-emitting transparent plate 10 is the lowest (nearly zero) at a specific wavelength (980 nm) of the infrared ray range.

Referring to FIG. 16(b), the absorption rate of the heat-emitting transparent plate 10 is the lowest (nearly zero) at the visible light range, gradually increases towards the infrared ray range, and is the largest at a specific wavelength (980 nm) of the infrared ray range. In this way, the absorbed infrared ray is transformed to heat in the metal layer 2061.

Referring to FIG. 16(*c*), the reflectivity of the heat-emitting transparent plate 10 is close to zero in the visible light range besides near the wavelength of 630 nm. The reflectivity at the wavelength of 630 nm is approximately 20%, and this reflectivity may not affect a total reflectivity of the visible light range. That is, in the case of the heat-emitting transparent plate 10, the transmissivity and visibility in the visible light range may be ensured.

In FIG. 16(*c*), the reflection rate of the infrared ray range is relatively higher than in the visible light range, but the maximum reflectivity in the infrared ray range is as low as approximately 10%.

Referring to FIG. 16(*a*), (*b*), and (*c*), as a result, it is seen that the heat-emitting transparent plate 10 according to an embodiment is transparent in the visible light range, and thus, may sufficiently ensure visibility, and may have an optical characteristic of absorbing at least 90% or above in the infrared ray range. The heat-emitting transparent plate 10 has a reflectivity of approximately maximum 10% near a wavelength of 980 nm in the infrared ray range, but this degree of the reflectivity does not affect a user.

Next, a method of manufacturing the heat-emitting transparent plate according to an embodiment will be described with reference to FIGS. 17 through 19.

Figure 17:
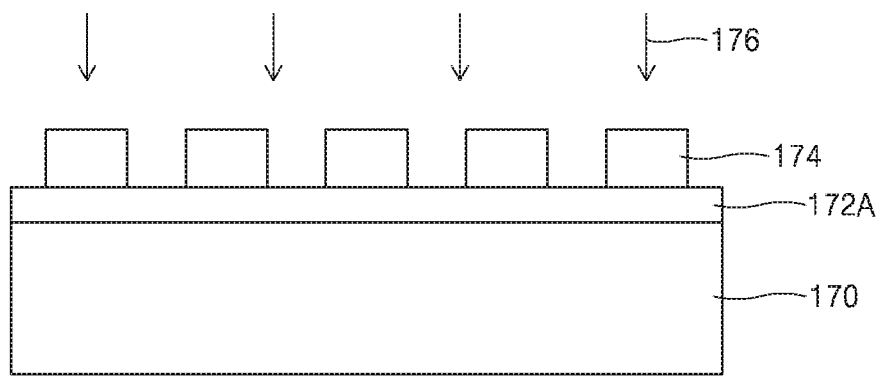
FIGS. 17 through 19 are cross-sectional views of a method of manufacturing a heat-emitting transparent plate according to an embodiment.
Figure 18:
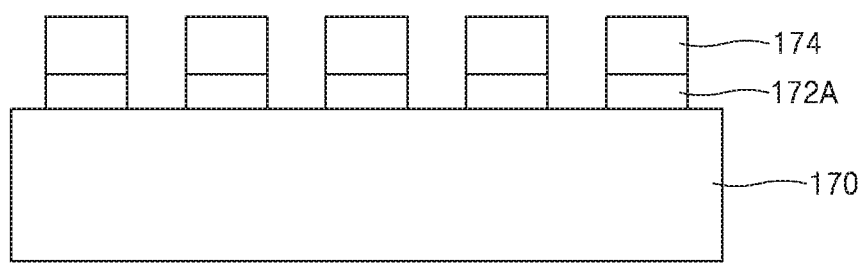

Referring to FIG. 17, a material layer 172A is formed on a substrate 170. The material layer 172A may cover all of an upper surface of the substrate 170. The substrate 170 may include a transparent material layer. The substrate 170 may include an entirely transparent material layer with respect to visible light, and as an example, may include a silicon oxide layer. The silicon oxide layer may include, for example, a $SiO_2$ layer. The substrate 170 may be the base substrate 14 of FIG. 2. The material layer 172A may be transparent to visible light and may have an optical characteristic of absorbing at least 80% of some bands of infrared rays. As an example, the material layer 172A may be a material layer that absorbs some bands of the infrared rays having a central wavelength of 980 nm, and the central wavelength may be a band between 1000 nm and 1500 nm. For example, the central wavelength may be 980 nm, 1300 nm, or 1500 nm. The material layer 172A may be formed as a monolayer or a multilayer. When the material layer 172A is formed as a multilayer, the material layer 172A may be formed to have a layer structure equal to any of the layer structures of the meta-patterns 20 described with reference to FIGS. 4 through 8. As an example, the material layer 172A may be formed by sequentially stacking the first dielectric layer 20A1, the metal layer 2061, and the second dielectric layer 20A2 on the substrate 170 along the layer structure of the meta-patterns 20 depicted in FIG. 4. The material layer 172A may have a thickness less than a wavelength of incident light that enters the substrate 170.

Next, a mask pattern 174 may be formed on the material layer 172A. The mask pattern 174 may be a photosensitive pattern. The mask pattern 174 may be used for defining the material layer 172A to form meta-patterns. That is, a portion of the material layer 172A that is covered by the mask pattern 174 may correspond to the meta-patterns, for example, the meta-patterns 20 of FIG. 2. Accordingly, dimensions (for example, pitch, diameter, etc.) of the mask pattern 174 may be dimensions corresponding to the dimensions (for example, pitch, diameter, etc.) of the meta-patterns 20 of FIG. 2. A plane shape of the mask pattern 174 may be a circular shape or a square shape, but may be different shapes. According to the shape of the mask pattern 174, various types of meta-patterns may be formed.

After the mask pattern 174 is formed, exposed portions of the material layer 172A are etched. The etching may be continued until the substrate 170 is exposed. An electron beam or ultraviolet rays (extreme ultraviolet rays) may be used as an exposure source 176 for etching. As a result of etching, as depicted in FIG. 18, a plurality of material layer patterns 172A are formed on the substrate 170. The plurality of material layer patterns 172A may correspond to the meta-patterns 20 of FIG. 2. According to a plane shape of the mask pattern 174, the material layer patterns 172A may instead be the meta-patterns 90 of FIG. 9. After the etching is completed, the mask pattern 174 is removed.

Figure 19:
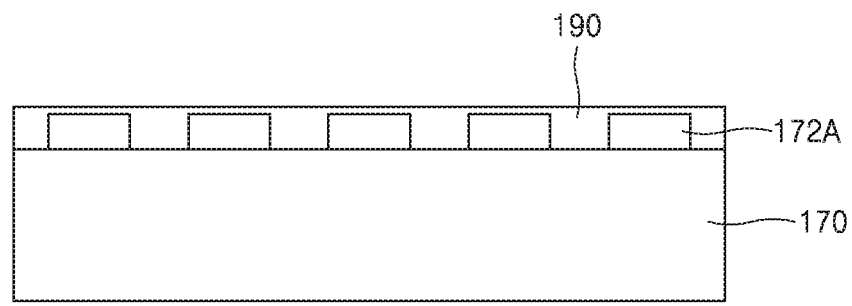

After the mask pattern 174 is removed, as depicted in FIG. 19, a passivation film 190 covering the material layer patterns 172A may be formed on the substrate 170. After the passivation film 190 is formed, an upper surface of the passivation film 190 may be planarized. The passivation film 190 may correspond to the passivation film 102 of FIG. 10. The passivation film 190 may include a transparent material with respect to visible light and infrared rays. As an example, the passivation film 190 may include a silicon oxide film.

When a recess is formed in advance before the material layer 172A is formed, and a process of forming the material layer 172A and subsequent processes are performed in the recess, the heat-emitting transparent plate depicted in FIG. 11 may be formed.

Figure 20:
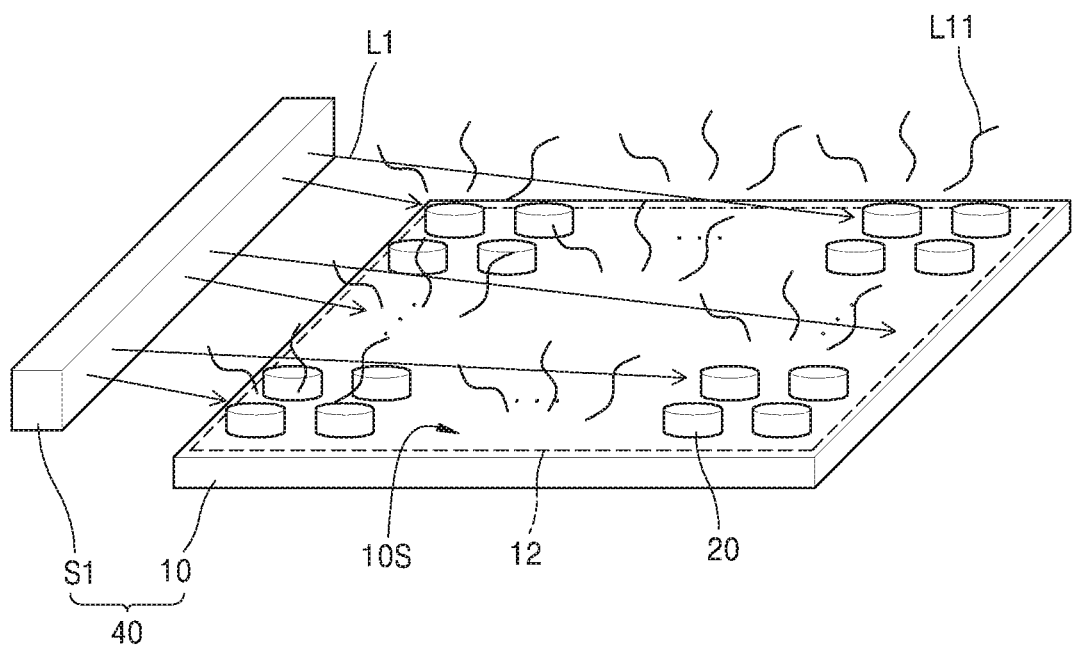
FIG. 20 is a perspective view of a heating emitting device including a heat-emitting transparent plate according to an embodiment.

FIG. 20 is a perspective view of a heat-emitting device 40 including a heat-emitting transparent plate 10 according to an embodiment.

Referring to FIG. 20, the heat-emitting device 40 includes the heat-emitting transparent plate 10 and a light source S1. A heat-emitting region 12 of the heat-emitting transparent plate 10 is a region emitting heat energy L11 by absorbing light L1, for example, infrared rays emitted from the light source S1. A passivation film covering the meta-patterns 20 in the heat-emitting transparent plate 10 is omitted for convenience. The light source S1 may include a light source that irradiates the light L1 of the infrared band to the heat-emitting region 12. The light source S1 may be arranged along a side or parallel to a side of the heat-emitting transparent plate 10. The light source S1 may include a light source that irradiates light of a wavelength of 980 nm or light that corresponds to an infrared ray having a wavelength greater than 1,000 nm to the heat-emitting region 12 (for example, infrared rays of 1,300 nm or 1,500 nm). As an example, the light source S1 may include a light-emitting element that emits light of the infrared band or an array of the light-emitting elements. In another embodiment, the light source S1 may include a light-emitting element that only emits the infrared band or an array of the light-emitting elements. The light-emitting element may be, for example, a light-emitting diode (LED) that emits infrared rays of the infrared band or emits light of only the infrared band. A plurality of light sources including the light source S1 may be arranged around the heat-emitting transparent plate 10. For example, the light sources S1 may be arranged on at least two places around the heat-emitting transparent plate 10 as shown, for example, in FIG. 23.

The light L1 incident from the light source S1 may slantingly enter an upper surface 10S of the heat-emitting transparent plate 10 at an angle greater than 45°. That is, the incident light L1 may enter with an incident angle greater than 45°. Here, the incident angle is the angle between the traveling direction of the light L1 and a direction normal to the surface 10S. The light source S1 may be arranged so that the light L1 emitted from the light source S1 meets the light incident conditions.

Next, objects to which the heat-emitting transparent plates according to embodiments are applied will be described.

Figure 21:
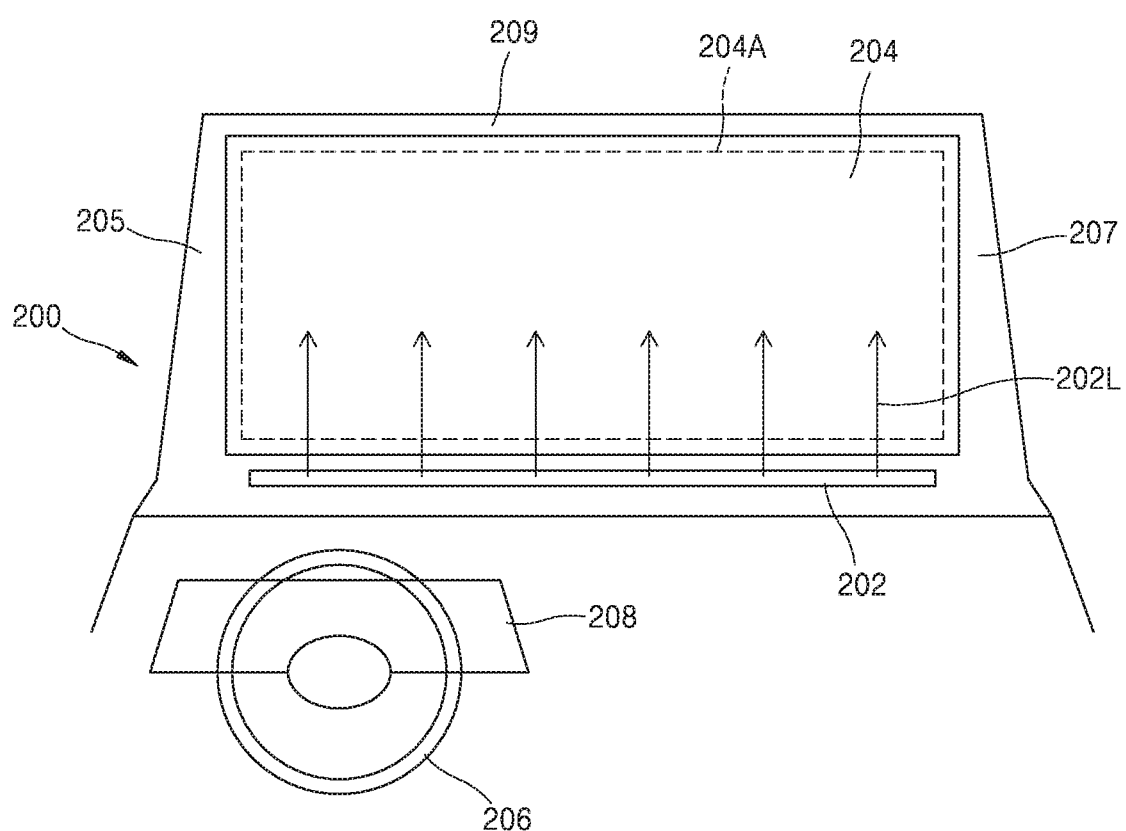
FIG. 21 is a diagram showing a case that a heat-emitting device according to an embodiment is applied to a windshield of a vehicle.

FIG. 21 is a diagram showing a vehicle 200 to which the heat-emitting device according to an embodiment is applied.

Referring to FIG. 21, a windshield 204 of the vehicle 200 includes a heat-emitting region 204A including a meta-surface. The windshield 204 may be the heat-emitting transparent plate 10 according to the present disclosure. The heat-emitting region 204A may be the heat-emitting region 12 of FIG. 1. The heat-emitting region 204A may include the meta-patterns 20 of any of the meta-patterns depicted in FIGS. 2 through 15. A light source 202 is arranged beside a lower part of the windshield 204. The light source 202 may be arranged on a vehicle body between an instrument panel 208 and the windshield 204. The light source 202 may be formed with a given length along a lower side of the windshield 204. The light source 202 may be arranged on a different location near the windshield 204. As an example, the light source 202 may be arranged on a vehicle body 205 on a left side of the windshield 204, on a vehicle body 207 on a right side of the windshield 204, or on a vehicle body 209 near an upper edge of the windshield 204. The light source 202 may be manually or automatically turned ON or OFF. The light source 202 may be connected to a power source of the vehicle 200, or may include a non-chargeable power source or a chargeable power source. When the light source 202 is connected to the power source of the vehicle 200, the light source 202 may be in a turned ON or OFF state depending on the starting ON or OFF of the vehicle 200.

In an embodiment, the light source 202 for irradiating light to the heat-emitting region 204A may be provided outside the vehicle 200. When the light source 202 is provided outside the vehicle 200, the light source 202 may be mounted on an external surface of the vehicle 200 around the windshield 204.

Reference numeral 206 in FIG. 21 indicates a steering wheel. The vehicle 200 of FIG. 21 may include a transportation vehicle that moves by using power. The transportation vehicle may include passenger cars, trucks, electric cars, hydrogen cars, heavy vehicles, rail vehicles, etc.

Figure 22:
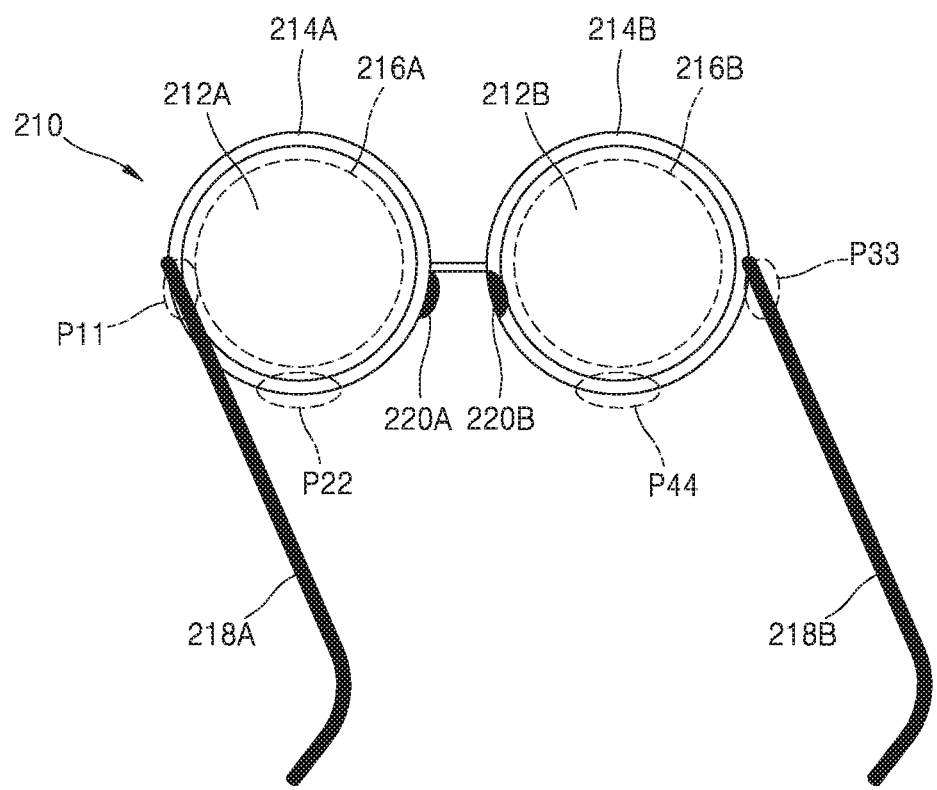
FIG. 22 is a perspective view showing a case that a heat-emitting device according to an embodiment is applied to glasses.

FIG. 22 shows glasses 210 as one of the objects to which the heat-emitting transparent plate according to the present disclosure is applied.

Referring to FIG. 22, the glasses 210 include a first glass lens 212A and a second glass lens 212B. The first glass lens 212A corresponds to a left eye of a glass wearer, and the second glass lens 212B corresponds to a right eye of the glass wearer. The first glass lens 212A is mounted on a part 214A (hereinafter, a first glass frame) of a glass frame 214A+214B+218A+218B that surrounds the first glass lens 212A. The second glass lens 212B is mounted on a part 214B (hereinafter, a second glass frame) of the glass frame 214A+214B+218A+218B. The first glass lens 212A and the second glass lens 212B respectively include meta-surfaces, and include a first heat-emitting region 216A and a second heat-emitting region 216B that emit heat by absorbing infrared rays. The first and second glass lenses 212A and 212B may be the heat-emitting transparent plate 10 according to an embodiment. The first and second heat-emitting regions 216A and 216B may include any of the meta-patterns depicted in FIGS. 2 through 15. A first light source that emits light towards the first heat-emitting region 216A may be arranged on the first glass frame 214A on which the first glass lens 212A is mounted. A second light source that emits light towards the second heat-emitting region 216B may be arranged on the second glass frame 214B on which the second glass lens 212B is mounted. The first light source and the second light source respectively may be arranged so that light is slantingly incident to the first heat-emitting region 216A and the second heat-emitting region 216B. As an example, the first light source may be mounted on a lowest part P22 of the first glass frame 214A. The second light source may be mounted on a lowest part P44 of the second glass frame 214B.

The first light source may be configured to be connected on an end of a part 218A (hereinafter, a third glass frame) of the glass frame 214A+214B+218A+218B. The end of the third glass frame 218A is connected to the first glass lens 212A or the first glass frame 214A, and the other end thereof is hanged on an ear of the glass wearer. As an example, the first light source may be mounted on a part P11 of the third glass frame 218A that is connected to the first glass lens 212A or the first glass frame 214A.

The second light source may be configured to be connected on an end of a part 218B (hereinafter, a fourth glass frame) of the glass frame 214A+214B+218A+218B. The end of the fourth glass frame 218B is connected to the second glass lens 212B or the second glass frame 214B, and the other end thereof is hanged on an ear of the glass wearer. As an example, the second light source may be mounted on a part P33 of the fourth glass frame 218B that is connected to the second glass lens 212B or the second glass frame 214B.

The glasses 210 may not include the first glass frame 214A and the second glass frame 214B. In this case, the third glass frame 218A may be directly connected to the first glass lens 212A, and the fourth glass frame 2188 may be directly connected to the second glass lens 212B. Also, the first light source may be arranged on the part P11 connected to the first glass lens 212A of the third glass frame 218A or on a first part 220A that is configured to put the glasses 210 on a nose and is protruded. The second light source may be arranged on the part P33 connected to the second glass lens 212A of the fourth glass frame 218A or on a second part 220B that is protruded and is configured to put the glasses 210 on a nose. The protruded first part 220A may be directly connected to the first glass lens 212A. The protruded second part 220B may be directly connected to the second glass lens 212B. When the glasses 210 include the first and second glass frames 214A and 214B, the protruded first and second parts 220A and 220B respectively may be directly connected to the first and second glass frames 214A and 214B.

Also, in the case that the glasses 210 include the first and second glass frames 214A and 214B, the first and second light sources may be respectively connected to the protruded first part 220A and the protruded second part 220B.

The first and second light sources mounted on the glasses 210 may be arranged so that light emitted from each of the first and second light sources is slantingly incident to the first heat-emitting region 216A and the second heat-emitting region 216B, for example, an incident angle is greater than 45°. In this way, the entire region of the first heat-emitting region 216A may be simultaneously irradiated by light emitted from the first light source, and the entire region of the second heat-emitting region 216B may be simultaneously irradiated by light emitted from the second light source. The light source S1 described with reference to FIG. 20 and a light source 234 to be described with reference to FIG. 23 may also be arranged so that light emitted from the light sources S1 and 234 may irradiate the entire regions of heat-emitting regions respectively corresponding to the light sources S1 and 234. The characteristics of light emission of the first and second light sources may be the same as those of the light source S1 described with reference to FIG. 20.

The heat-emitting transparent plate and the light sources applied to the glasses 210 of FIG. 22 may also be applied to glasses that do not have the third and fourth glass frames 218A and 2186, and may also be applied to glasses of different types, for example, goggles or helmets.

Figure 23:
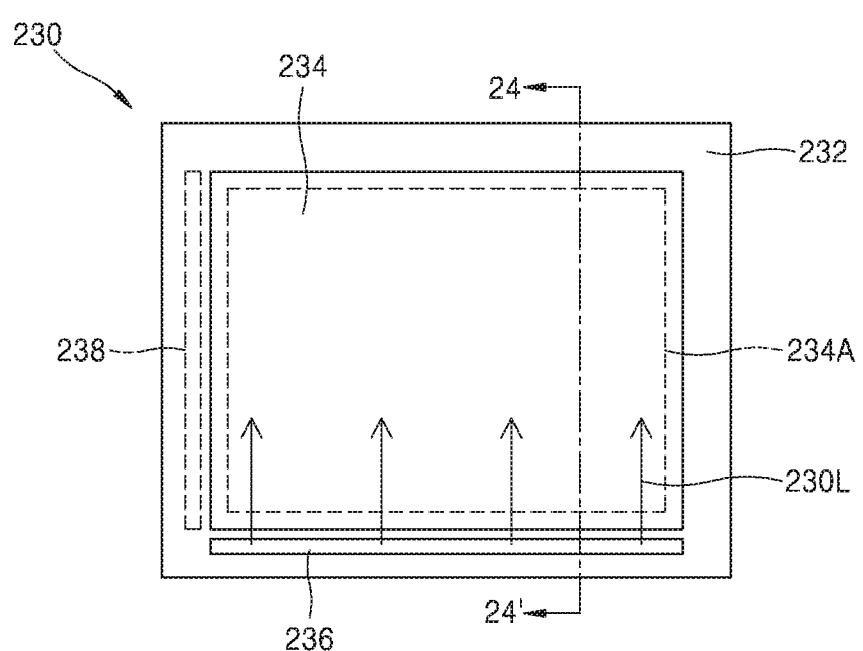
FIG. 23 is a front view of a glass window showing a case that a heat-emitting device according to an embodiment is applied to the glass window of a building.

FIG. 23 shows a glass window 230 as an example of objects to which a heat-emitting transparent plate according to an embodiment is applied.

Referring to FIG. 23, the glass window 230 includes a window frame 232 and glass 234 inserted in the window frame 232. The glass 234 may include a heat-emitting region 234A including a meta-surface. The glass 234 may be a heat-emitting transparent plate according to the disclosure. The heat-emitting region 234A may include any of the meta-patterns described with reference to FIGS. 2 through 15. A light source 236 is arranged on the window frame 232. The light source 236 is provided to irradiate light onto the heat-emitting region 234A. The light source 236 may be arranged so that light 230L emitted from the light source 236 may slantingly enter the heat-emitting region 234A. Accordingly, the light 230L emitted from the light source 236 may be irradiated onto the entire heat-emitting region 234A. The light source 236 may be arranged on a window frame below the glass 234. The light source 236 may be arranged on different locations of the window frame 232, for example, as indicated by reference numeral 238, may be arranged on the window frame 232 on a left side of the glass 234. The light source 236 may be arranged on the window frame 232 on a right side of the glass 234 or above the glass 234. The light source 236 may be simultaneously arranged on a few locations of the window frame 232. For example, the light sources 236 may be arranged on the window frame 232 below the glass 234 and on the right side of the glass 234, respectively. The light source 236 may include a light-emitting diode that emits light of an infrared band onto the heat-emitting region 234A. The light emitting characteristic of the light source 236 may be the same as that of the light source S1 described with reference to FIG. 20.

Figure 24:
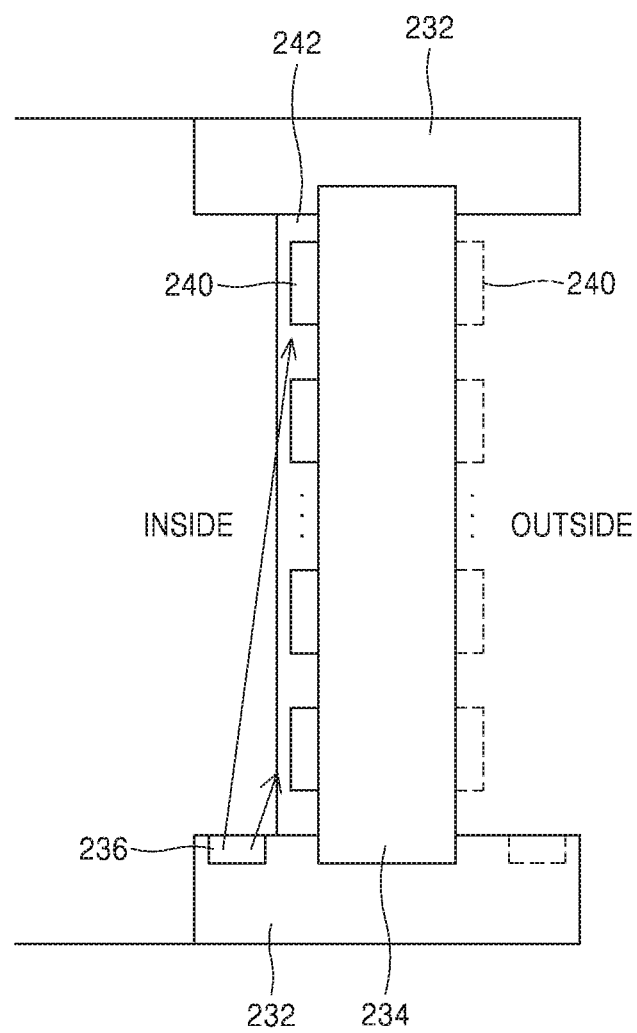
FIG. 24 is a cross-sectional view taken along line 24-24' of FIG. 23.

FIG. 24 is a cross-sectional view taken along line 24-24' of FIG. 23.

Referring to FIG. 24, a plurality of meta-patterns 240 are present on an inner surface of the glass 234. The plurality of meta-patterns 240 may be any of the meta-patterns described with reference to FIGS. 2 through 15. The plurality of meta-patterns 240 may be distributed with a constant pitch on the entire heat-emitting region 234A, but some of the plurality of meta-patterns 240 may be distributed with a pitch different from that of the remaining meta-patterns 240. The plurality of meta-patterns 240 may be covered by a passivation film 242. The passivation film 242 may be the passivation film 102 of FIG. 10. The plurality of meta-patterns 240, as indicated by dashed lines, may be present on an outer surface of the glass 234 instead of an inner side thereof, and the light source 236 may also be arranged on a location outside the glass 234.

In embodiments, the plurality of meta-patterns 240 may be provided on both sides of the glass 234. The light source 236 may also be provided on a portion of the window frame 232 inside the glass 234 and on a portion of the window frame 232 outside the glass 234, respectively.

The glass window 230 described with reference to FIGS. 23 and 24 may be applied to glass windows of buildings, and also, may be applied to glass windows of transportation means, for example, glass windows of airplanes or trains.

Also, the heat-emitting transparent plates according to embodiments may be applied to all glasses mounted on regions where a mist or frost occurs on one of surfaces of the glass due to a temperature difference between the inside and outside of the glass. For example, the heat-emitting transparent plate according to the present disclosure may be used as a window to view an object of a fixed device that does not have a self-mobilization means.

The heat-emitting transparent plate according to the present disclosure transmits visible light and emits heat by absorbing infrared rays. Therefore, a temperature difference between both surfaces of the heat-emitting transparent plate may be minimized. Accordingly, a viewing obstacle or a viewing interruption phenomenon, for example, the formation of a mist or frost on a glass window due to a temperature difference between opposing surfaces of the heat-emitting transparent plate may be prevented, and a viewing obstacle or a viewing interruption phenomenon may be rapidly removed. Accordingly, when the heat-emitting transparent plate is applied to various objects (for example, living convenience tools, such as glasses, goggles, and helmets, various transportation means, buildings having glass windows, and fixed apparatuses having glass windows) together with a light source that emits infrared rays, a clean view may be rapidly provided to a user, and also, in particular, in an atmosphere in which temperature is changed, a clean view may be rapidly provided to a user, and thus, visibility may be increased.

Also, the heat emission characteristic of the heat-emitting transparent plate according to the present disclosure is realized from a meta-surface. Thus, the heat-emitting transparent plate is free from electrical problems, such as a short circuit of heating wires, and thus, safety of the heat-emitting transparent plate may be ensured. The meta-patterns of the meta-surface are covered by a passivation film, and thus, damage to the meta-surface in processes of treating the glass, such as cleaning or window tinting may be prevented.

While one or more embodiments have been described with reference to the figures, it will be understood by those of ordinary skill in the art that various changes in form and details may be made therein without departing from the spirit and scope as defined by the following claims.

What is claimed is:

1. A heat-emitting transparent plate comprising:
   a heat-emitting region that is transparent to visible light and configured to emit heat by absorbing infrared rays,
   wherein the heat-emitting region comprises a meta-surface,
   wherein the meta-surface comprises a plurality of meta-patterns configured to absorb the infrared rays, and
   wherein the plurality of meta-patterns comprise:
      a plurality of first meta-patterns; and
      a plurality of second meta-patterns different from the plurality of first meta-patterns.

2. The heat-emitting transparent plate of claim 1, wherein each meta-pattern from among the plurality of meta-patterns comprises a dielectric layer and a metal layer that are stacked.

3. The heat-emitting transparent plate of claim 1, wherein the heat-emitting region comprises:
   a base substrate; and
   the plurality of meta-patterns formed on the base substrate.

4. The heat-emitting transparent plate of claim 1, wherein the heat-emitting region comprises:
   a base substrate having a recess; and
   the plurality of meta-patterns formed in the recess.

5. The heat-emitting transparent plate of claim 1, further comprising a passivation film covering the plurality of meta-patterns.

6. The heat-emitting transparent plate of claim 1, wherein the infrared rays have a wavelength range from 900 nm to 1,500 nm.

7. The heat-emitting transparent plate of claim 1, wherein a pitch of the plurality of first meta-patterns is different from a pitch of the plurality of second meta-patterns.

8. The heat-emitting transparent plate of claim 1, wherein a pitch of the plurality of first meta-patterns is equal to a pitch of the plurality of second meta-patterns, and
wherein a plane shape of the plurality of first meta-patterns is different from a plane shape of the plurality of second meta-patterns.

9. The heat-emitting transparent plate of claim 1, wherein each meta-pattern from among the plurality of meta-patterns comprises a first dielectric layer, a metal layer, and a second dielectric layer that are sequentially stacked.

10. The heat-emitting transparent plate of claim 1, wherein each meta-pattern from among the plurality of meta-patterns has a layer structure in which a plurality of dielectric layers and a plurality of metal layers are sequentially and alternately stacked, and
wherein a dielectric layer from among the plurality of dielectric layers is stacked before any of the plurality of metal layers.

11. The heat-emitting transparent plate of claim 1, wherein each meta-pattern from among the plurality of meta-patterns has a layer structure in which a plurality of metal layers and a plurality of dielectric layers are sequentially and alternately stacked, and
wherein a metal layer from among the plurality of metal layers is stacked before any of the plurality of dielectric layers.

12. The heat-emitting transparent plate of claim 2, wherein the metal layer comprises a first metal layer and a second metal layer that are sequentially stacked.

13. The heat-emitting transparent plate of claim 7, wherein a plane shape of the plurality of first meta-patterns is identical to a plane shape of the plurality of second meta-patterns.

14. The heat-emitting transparent plate of claim 8, wherein the plurality of first meta-patterns and the plurality of second meta-patterns are alternately arranged in a direction.

15. The heat-emitting transparent plate of claim 7, wherein the pitch of the plurality of first meta-patterns is less than a wavelength of incident light.

16. The heat-emitting transparent plate of claim 9, wherein optical characteristics of the first dielectric layer are equal to optical characteristics of the second dielectric layer.

17. The heat-emitting transparent plate of claim 9, wherein a thickness of the first dielectric layer is equal to a thickness of the second dielectric layer.

18. The heat-emitting transparent plate of claim 9, wherein optical characteristics of the first dielectric layer are equal to optical characteristics of the second dielectric layer.

19. The heat-emitting transparent plate of claim 12, wherein optical characteristics of the first metal layer are equal to optical characteristics of the second metal layer.

20. The heat-emitting transparent plate of claim 3, further comprising a passivation film covering the plurality of meta-patterns.

21. The heat-emitting transparent plate of claim 4, further comprising a passivation film covering the plurality of meta-patterns.

22. The heat-emitting transparent plate of claim 8, wherein the pitch of the plurality of first meta-patterns is less than a wavelength of incident light.

23. A heat-emitting device comprising:
the heat-emitting transparent plate of claim 1; and
a light source configured to emit the infrared rays to the heat-emitting transparent plate.

24. The heat-emitting device of claim 23, wherein an incidence angle of the infrared rays incident to the heat-emitting transparent plate is greater than 45°.

25. The heat-emitting device of claim 23, wherein the light source is arranged along a side of the heat-emitting transparent plate.

26. The heat-emitting device of claim 23, wherein the light source is arranged at at least two locations around the heat-emitting transparent plate.

27. A method of manufacturing a heat-emitting transparent plate, the method comprising:
forming a material layer on a transparent substrate; and
forming a plurality of patterns on the transparent substrate by patterning the material layer,
wherein the plurality of patterns comprise a material that is transparent to visible light, the material being configured to emit heat by absorbing infrared rays, and
wherein a pitch of the plurality of patterns is less than a wavelength of the infrared rays.

28. The method of claim 27, wherein the forming of the material layer comprises forming a dielectric layer and forming a metal layer.

29. The method of claim 27, wherein some patterns from among the plurality of patterns have a plane shape different from a plane shape of the remaining patterns from among the plurality of patterns.

30. The method of claim 27, wherein a pitch of a first pattern from among the plurality of patterns is different from a pitch of a second pattern from among the plurality of patterns.

31. The method of claim 27, wherein the pitch of the plurality of patterns gradually increases from one end of the heat-emitting transparent plate to another end of the heat-emitting transparent plate.

32. The method of claim 27, further comprising forming a passivation layer covering the plurality of patterns.

33. The method of claim 27, wherein the forming of the material layer comprises:
forming a first dielectric layer on the transparent substrate;
forming a metal layer on the first dielectric layer; and
forming a second dielectric layer on the metal layer.

34. The method of claim 28, wherein the forming of the material layer comprises forming a plurality of dielectric layers sequentially and alternately stacked more than twice with a plurality of metal layers.

35. The method of claim 28, wherein the metal layer is formed before the dielectric layer.

36. The method of claim 35, wherein the dielectric layer includes a plurality of dielectric layers and the metal layer includes a plurality of metal layers, and
wherein the forming of the material layer comprises forming the plurality of metal layers sequentially and alternately stacked for more than twice with the plurality of dielectric layers.

37. A method of manufacturing a heat-emitting transparent plate, the method comprising:
forming a recess in a transparent substrate;
forming a material layer in the recess; and forming a plurality of patterns in the recess by patterning the material layer, wherein the plurality of patterns comprise a material that is transparent to visible light, the material being configured to emit heat by absorbing infrared rays, and wherein a pitch of the plurality of patterns is less than a wavelength of the infrared rays.

38. The method of claim 37, wherein the plurality of patterns comprise a dielectric layer and a metal layer that are sequentially stacked.

39. The method of claim 37, wherein each pattern from among the plurality of patterns comprises:
a first dielectric layer;
a metal layer formed on the first dielectric layer; and
a second dielectric layer formed on the metal layer.

40. The method of claim 37, further comprising forming a passivation film covering the plurality of patterns.

41. An object comprising the heat-emitting device of claim 23, wherein the heat-emitting transparent plate is used as a window through which a portion of the object is viewed.

42. The object of claim 41, wherein the window is provided on one from among a transportation device, a helmet, goggles, glasses, a building, and a fixed apparatus.

\* \* \* \* \*